US 12,555,131 B2

(12) United States Patent
Huettl

(10) Patent No.: US 12,555,131 B2
(45) Date of Patent: Feb. 17, 2026

(54) METHOD FOR AUTOMATED SURVEYING OF HOTEL GUESTS

(71) Applicant: Actinium Consulting AG, Lindau (DE)

(72) Inventor: Klaus Huettl, Hoerbranz (AT)

(73) Assignee: Actinium Consulting AG, Lindau (DE)

( * ) Notice: Subject to any disclaimer, the term of this patent is extended or adjusted under 35 U.S.C. 154(b) by 153 days.

(21) Appl. No.: 18/280,987

(22) PCT Filed: Mar. 9, 2022

(86) PCT No.: PCT/EP2022/056099
§ 371 (c)(1),
(2) Date: Sep. 8, 2023

(87) PCT Pub. No.: WO2022/194650
PCT Pub. Date: Sep. 22, 2022

(65) Prior Publication Data
US 2024/0152942 A1     May 9, 2024

(30) Foreign Application Priority Data

Mar. 16, 2021 (DE) ...................... 10 2021 106 320.5

(51) Int. Cl.
*G06Q 30/0203* (2023.01)
*G06Q 50/12* (2012.01)
*H04N 21/475* (2011.01)

(52) U.S. Cl.
CPC ......... *G06Q 30/0203* (2013.01); *G06Q 50/12* (2013.01); *H04N 21/4758* (2013.01)

(58) Field of Classification Search
CPC .............. G06Q 30/0203; G06Q 50/12; H04N 21/4758; H04N 21/254; H04N 21/25866; H04N 21/42221
See application file for complete search history.

(56) References Cited

U.S. PATENT DOCUMENTS 4,994,908 A    2/1991   Kuban et al.
6,970,831 B1   11/2005   Anderson et al.
(Continued)

FOREIGN PATENT DOCUMENTS

WO   WO-2004010715 A2 *   1/2004  ............. G06Q 30/02
WO   WO-2020194060 A1 * 10/2020  ......... G06Q 30/0282

OTHER PUBLICATIONS

Sapatnekar, A., Smart Hotel Room Management with IoT for Guest Counting and Service Personalization, IEEE, 2023 International Conference on Integrated Intelligence and Communication Systems (Year: 2023).*

(Continued)

*Primary Examiner* — Dylan C White
(74) *Attorney, Agent, or Firm* — Collard & Roe, P.C.

(57) ABSTRACT

A method for automated surveying of hotel guests uses a television device in the hotel room. The method is executed by an interface measurement circuit for detecting the connection of an external playback device and a video signal switch for switching the signal source to an external television device, a) wherein when the television device is switched on by an external remote control, an external minicomputer sends video data to the video input of the television device via the interface measurement circuit and the video signal switch instead of the data received during normal operation. These video data include a survey software, b) wherein the hotel guest sends the survey answers to the minicomputer via the remote control, c) wherein when the survey is completed, the television device is switched back to normal operation, and d) wherein the survey answers are sent to a hotel server by the minicomputer.

5 Claims, 1 Drawing Sheet

(56) References Cited

U.S. PATENT DOCUMENTS

| | | | |
|---|---|---|---|
| 10,200,315 B2* | 2/2019 | Tiernan | H04L 51/52 |
| 10,547,875 B2* | 1/2020 | Ogle | H04N 21/478 |
| 10,698,648 B2* | 6/2020 | Oztaskent | G06F 3/1454 |
| 12,265,929 B2* | 4/2025 | Bidner | G06Q 10/02 |
| 2013/0178243 A1* | 7/2013 | Tsai | H04M 1/72412 |
| | | | 455/556.1 |
| 2014/0123186 A1 | 5/2014 | Reisman | |
| 2016/0219324 A1 | 7/2016 | Wang | |
| 2016/0330488 A1* | 11/2016 | Ogle | H04N 21/478 |
| 2017/0054296 A1* | 2/2017 | Daniel | H04L 12/10 |
| 2019/0068921 A1 | 2/2019 | Hicks et al. | |
| 2022/0172135 A1* | 6/2022 | Bidner | G06F 3/0482 |
| 2022/0188872 A1* | 6/2022 | Bidner | G06Q 30/0239 |

OTHER PUBLICATIONS

Sapatnekar, Amol; Smart Hotel Room Management with IoT for Guest Counting and Service Personalization, 2023, IEEE, pp. 1-5 (Year: 2023).*

Sepetnekar, Amol, Smart Hotel Room Management with IOT for Guest Counting and Service Personalization, IEEE 2023 International Conference on Integrated Intelligence and Communication Systems, 1-5 (Year: 2023).*

International Search Report in PCT/EP2022/056099, mailed Jun. 9, 2022.

* cited by examiner

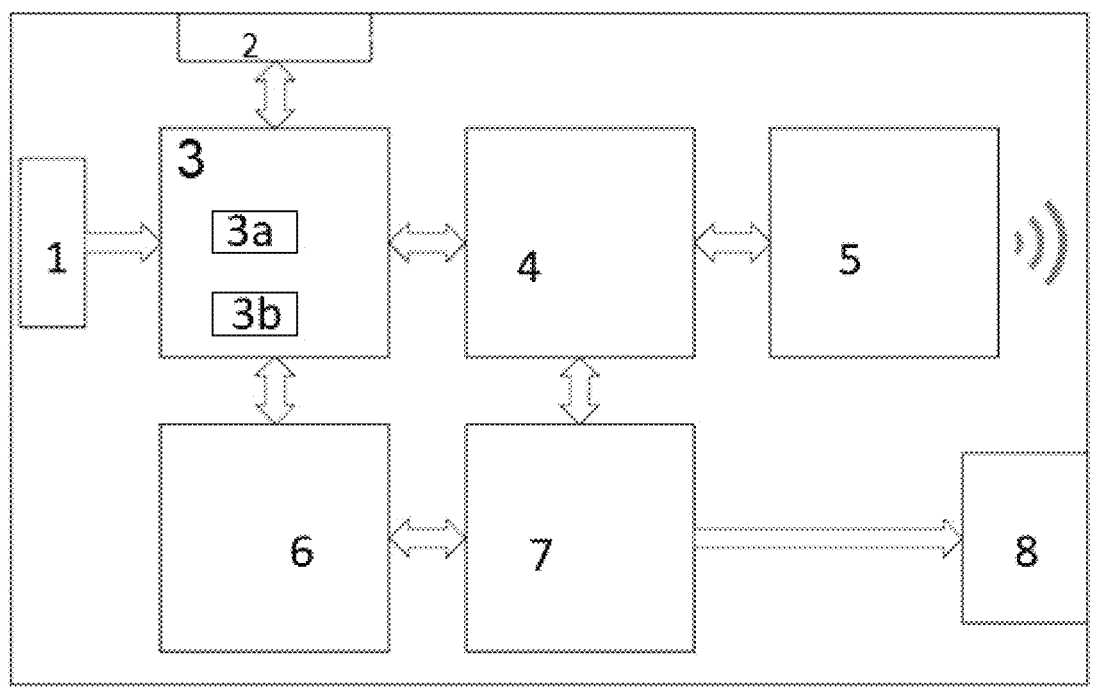

METHOD FOR AUTOMATED SURVEYING OF HOTEL GUESTS

CROSS REFERENCE TO RELATED APPLICATIONS

This application is the National Stage of PCT/EP2022/056099 filed on Mar. 9, 2022, which claims priority under 35 U.S.C. § 119 of German Application No. 10 2021 106 320.5 filed on Mar. 16, 2021, the disclosure of which is incorporated by reference. The international application under PCT article 21(2) was not published in English.

The invention relates to a method for automated solicitation of opinions from hotel guests by means of a television device provided in the hotel room.

CONCERNING THE PRIOR ART

From US 2014/0 123 186 A1, a hardware for use by hotel guests is known wherein the hardware comprises an infrared interface for reception of the infrared signals of an external TV remote control, a communications module for sending data over the mobile network, a capability for detection of connection of an external playback device, a minicomputer, and a microcontroller having an infrared manager for reception of data from the infrared interface and for output of data to the minicomputer.

No suggestion of a use of the hardware for the automated complaint management in hotels or for automated solicitation of opinions from hotel guests can be found in US 2014/0 123 186 A1.

A "2-Port HDMI® Automatic Switch—4K" device is also known. Herein a rapid and possibly automatic switchover to the last connected HDMI source (auto switching) is described.

The description of that device likewise contains no suggestion of a use of the hardware for the automated complaint management in hotels or for automated solicitation of opinions from hotel guests.

Task and Accomplishment of the Invention

Task of the invention: The invention is intended to improve the quality of the service in hotels by queries on the television devices in the respective hotel rooms. It permits an automated solicitation of opinions from the guests.

According to the invention, this task is accomplished in the method for automated solicitation of opinions from hotel guests of the type mentioned in the introduction in that the method is executed by means of an interface measuring circuit (6) for detection of connection of an external playback device and of a video signal switchover (7) for switching the signal source over to an external television device,
   a) in that, upon switching-on of the television device by means of an external remote control, an external minicomputer (4) sends video data instead of the data received during normal operation to the video input of the television device via the interface measuring circuit (6) and the video signal switchover (7), wherein these video data comprise a survey software, b) in that the hotel guest sends the survey answers via the remote control to the minicomputer (4),
   c) in that, after completion of the survey, the television device is switched back over to normal operation and
   d) in that the survey answers are sent by the minicomputer (4) to a hotel server.

Advantageous configurations of the invention are listed in the dependent claims.

Thus it is proposed:
   that the method be executed by means of a hardware and that the hardware comprise an infrared interface (1) for reception of the infrared signals of the remote control, a SIM module (5) for sending data over the mobile network, and a microcontroller having an infrared manager (3b) for reception of data from the infrared interface (1) and for output of data to the minicomputer (4),
wherein, upon switching-on of the external television device, the video signal switchover (7) switches the signal source over to the television device,
   that the hardware comprise a learning function, in order to be able to learn infrared remote controls of different manufacturers of television devices,
   that the infrared manager (3b) be designed to decode the different infrared protocols and to send the necessary data to the minicomputer (4), which saves these,
   that the hardware comprise a power manager (3a), which is designed to regulate the powering up and powering down of the minicomputer (4), in order to prevent damage to the file system on the minicomputer (4),
   that the hardware be designed to switch the video signal over sometimes by hardware and sometimes by software and, in fact, depending on whether or not the external television device supports a digital protocol.

EXEMPLARY EMBODIMENT

An exemplary embodiment of the invention will be explained in more detail in the following on the basis of a drawing.

The single FIGURE shows a block diagram of the exemplary embodiment.

MODE OF OPERATION OF THE METHOD FOR AUTOMATED SOLICITATION OF OPINIONS FROM HOTEL GUESTS BY MEANS OF A TELEVISION DEVICE PROVIDED IN THE HOTEL ROOM

The remote control of the television device is used as the input device. The hardware according to the invention possesses an infrared interface 1, in order to be able to receive the infrared signals of the TV remote control. The hardware possesses a learning function, in order to be able to learn infrared remote controls of numerous manufacturers of television devices. The infrared manager 3b decodes various infrared protocols and sends the necessary data to the minicomputer 4, which saves these. The power manager 3a regulates the powering up and powering down of the minicomputer 4 in order to prevent damage to the file system on the minicomputer 4.

The minicomputer 4 provides a software, in which the communication with the SIM module 5 and the control unit of the video signal switchover 7 is implemented. The software has a graphical user interface, which is sent to the television viewer by means of a video signal. Thereby the hotel guest can be guided on the television device through the survey procedure. After the survey has been completed, the survey data are sent to a server. The sending of the data takes place by means of a SIM module 5, which dispatches the data over the mobile network.

As soon as the television device has been switched on, this is recognized by the hardware, which switches the signal source over to the television device, so that the graphical use interface appears on the screen of the TV device. The detection of whether the television device has been switched on is achieved by hardware and by software. The detection by the hardware is achieved via the interface measuring circuit 6 and the detection by the software via a digital TV interface, which functions as the video signal output 8. The interface measuring circuit 6 sends its measured values to the microcontroller 3 having the power manager 3a and infrared manager 3b, so that the measured values can be further processed there.

The switchover of the video signal is achieved sometimes by hardware and sometimes by software. This depends on whether the television device supports a digital protocol, with which the software is able to bring about the switchover of the video signal. Otherwise the video signal is switched over with a hardware module.

LIST OF REFERENCE SYMBOLS

1 IR receiver
2 Voltage supply
3 Microcontroller
3a Power manager (microcontroller)
3b Infrared manager (microcontroller)
4 Minicomputer
5 SIM module
6 Interface measuring circuit (detection of connection of an external playback device)
7 Video signal switchover
8 Video signal output

The invention claimed is:

1. A method for automated solicitation of opinions from hotel guests by means of a television device provided in the hotel room, the method comprising:
   providing an additional external hardware system in addition to and external to the television device and comprising an infrared interface for reception of infrared signals transmitted from a remote control of the television device, a SIM module for sending data over a mobile network, a minicomputer connected to the SIM module, a microcontroller having an infrared manager for reception of data from the infrared interface and for output of data to the minicomputer, an interface measuring circuit connected to the microcomputer for detection of connection of an external playback device, a video signal switchover connected to the interface measuring circuit and to the minicomputer for switching a signal source over to the television device, and a video signal output to a video input of the television device, wherein the additional external hardware system comprises a learning function, in order to be able to learn infrared remote controls of different manufacturers of television devices;
   a) upon switching-on of the television device by the remote control, sending by the minicomputer video data comprising a survey software instead of data received during normal operation of the television device to the video input of the television device via the interface measuring circuit and the video signal switchover and switching the signal source over to the television device by the video signal switchover;
   b) configuring the infrared interface to receive infrared signals transmitted from the remote control based on the results of the learning function;
   c) sending survey answers of a survey in the survey software via the remote control to the minicomputer;
   d) after completion of the survey, switching the television device back over to normal operation by the video signal switchover, and
   e) sending by the minicomputer the survey answers to a hotel server.

2. The method according to claim 1, wherein the infrared manager is designed to decode the different infrared protocols and to send the necessary data to the minicomputer, which saves these.

3. The method according to claim 2, further comprising:
   sending a decoded signal from the microcontroller to the minicomputer;
   evaluating the decoded signal by the minicomputer to determine whether or not the television device supports a digital protocol;
   controlling the video switchover by the minicomputer so that the video signal is switched over using software if the television device supports the digital protocol and is switched over using a hardware module if the television device does not support the digital protocol.

4. The method according to claim 1, wherein the additional external hardware system comprises a power manager, which is designed to regulate the powering up and powering down of the minicomputer, in order to prevent damage to the file system on the minicomputer.

5. A system for automated solicitation of opinions from a hotel guest comprising
   a television device provided in a hotel room; and
   an additional external hardware system in the hotel room in addition to and external to the television device, the additional external hardware system being connected to the television device;
   wherein the additional external hardware system comprises:
      an infrared interface for reception of infrared signals transmitted from a remote control of the television device,
      a SIM module for sending data over a mobile network,
      a minicomputer connected to the SIM module,
      a microcontroller having an infrared manager for reception of data from the infrared interface and for output of data to the minicomputer,
      an interface measuring circuit connected to the microcomputer for detection of connection of an external playback device,
      a video signal switchover connected to the interface measuring circuit and to the minicomputer for switching a signal source over to the television device, and
      a video signal output to a video input of the television device;
   wherein the additional external hardware system comprises a learning function, in order to be able to learn infrared remote controls of different manufacturers of television devices;
   wherein the infrared interface is configured to receive infrared signals transmitted from the remote control based on the results of the learning function;
   wherein the additional external hardware system is configured so that:
      upon switching-on of the television device by the remote control, the minicomputer sends video data comprising a survey software instead of data received during normal operation of the television device to the video input of the television device via the interface measuring circuit and the video signal switchover and the signal source is switched over to the television device by the video signal switchover;

survey answers of a survey in the survey software are sent via the remote control to the minicomputer;

after completion of the survey, the television device is switched back over to normal operation by the video signal switchover, and the minicomputer sends the survey answers to a hotel server.

* * * * *